United States Patent
Olper et al.

(10) Patent No.: US 8,409,421 B2
(45) Date of Patent: Apr. 2, 2013

(54) PROCESS FOR PRODUCING METALLIC LEAD STARTING FROM DESULFURIZED PASTEL

(75) Inventors: Marco Olper, Monza (IT); Carmelita Roncaldier, legal representative, Monza (IT); Carlo Olper, legal representative, Vedano al Lambro (IT); Luigi Olper, legal representative, Vedano al Lambro (IT); Alessandro Olper, legal representative, Monza (IT); Massimo Maccagni, Sesto S. Giovanni (IT); Silvano Cossali, Ponte Nossa (IT)

(73) Assignee: Engitec Technologies S.p.A., Novate Milanese (IT)

( * ) Notice: Subject to any disclaimer, the term of this patent is extended or adjusted under 35 U.S.C. 154(b) by 158 days.

(21) Appl. No.: 12/745,067

(22) PCT Filed: Nov. 27, 2008

(86) PCT No.: PCT/IB2008/003307
§ 371 (c)(1), (2), (4) Date: May 27, 2010

(87) PCT Pub. No.: WO2009/068988
PCT Pub. Date: Jun. 4, 2009

(65) Prior Publication Data
US 2011/0083970 A1    Apr. 14, 2011

(30) Foreign Application Priority Data
Nov. 30, 2007   (IT) .............. MI2007A2257

(51) Int. Cl.
*C25C 1/18*   (2006.01)
(52) U.S. Cl. ........ 205/599; 205/597; 205/600; 205/601; 205/598; 423/98
(58) Field of Classification Search ............... 423/98; 205/597, 598, 599, 600, 601
See application file for complete search history.

(56) References Cited

U.S. PATENT DOCUMENTS 1,627,351 A * 5/1927 Alexander ............... 423/98
1,911,604 A * 5/1933 Calbeck ............... 205/465
(Continued)

FOREIGN PATENT DOCUMENTS

BG    49893    3/1992
DE    40 33 232    4/1991
(Continued)

OTHER PUBLICATIONS

Kuznetsova et al, "Desulfation of Active Paste from Lead Battery Scrap with Ammonium Carbonate", Russian Journal of Applied Chemistry, 2008, vol. 81, No. 7, pp. 1283-1286.*

(Continued)

*Primary Examiner* — Harry D Wilkins, III
(74) *Attorney, Agent, or Firm* — Oblon, Spivak, McClelland, Maier & Neustadt, L.L.P.

(57) ABSTRACT

The present invention relates to an electrolytic process for producing metallic lead starting from desulfurized lead pastel comprising the following operative phases: a) leaching the desulfurized pastel by putting it in contact with a solution comprising ammonium chloride, with the formation of a leach liquor and evolution of gaseous CO2; b) separating a first solid residue and a first clarified leach liquor from the leach liquor coming from phase a); c) leaching the solid residue separated in phase b) by putting it in contact with a solution comprising ammonium chloride and hydrogen peroxide; d) separating a second solid residue and a second clarified leach liquor from the leach liquor coming from phase c); e) joining the first clarified leach liquor coming from phase b) with the second clarified leach liquor coming from phase d) and forming a single solution; f) subjecting the solution leaving phase e) to electrolysis in a flow cell, with a current density ranging from 50 to 10,000 A/m2, said electrolysis resulting in the formation of a lead sponge. The present invention also relates to the relative desulfurization process of the pastel.

26 Claims, 6 Drawing Sheets

U.S. PATENT DOCUMENTS

Figure 1:
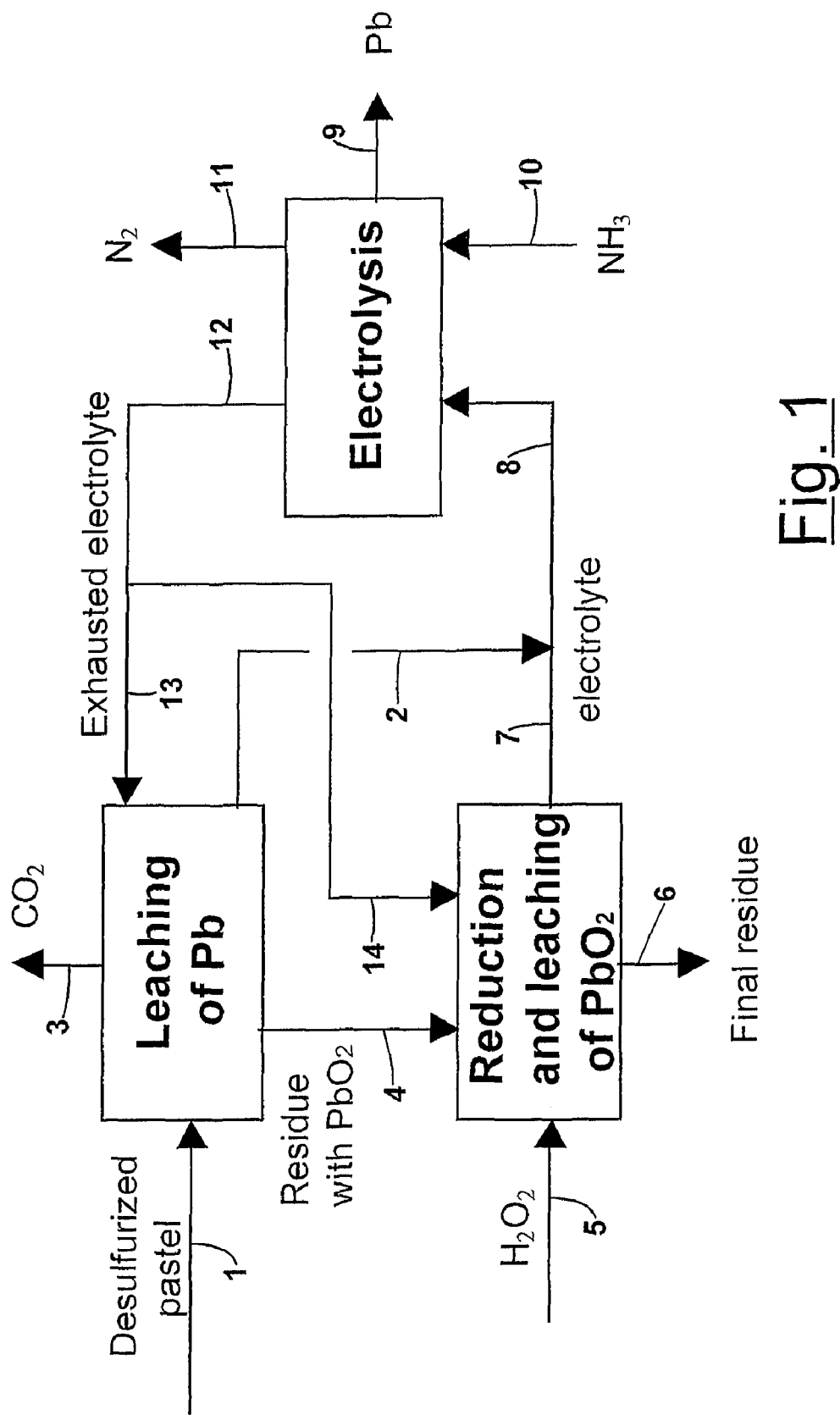

| | | | | |
|---|---|---|---|---|
| 3,440,155 A * | 4/1969 | Pickering et al. | ............. | 205/599 |
| 3,849,121 A * | 11/1974 | Burrows | ............. | 75/725 |
| 3,883,348 A * | 5/1975 | Acoveno et al. | ............. | 75/432 |
| 4,096,045 A * | 6/1978 | Ahonen et al. | ............. | 205/600 |
| 4,107,007 A * | 8/1978 | Gaumann et al. | ............. | 205/599 |
| 4,229,271 A * | 10/1980 | Prengaman et al. | ............. | 205/599 |
| 4,269,811 A * | 5/1981 | Striffler et al. | ............. | 423/92 |
| 4,273,746 A * | 6/1981 | Kolakowski | ............. | 423/92 |
| 4,769,116 A * | 9/1988 | Olper et al. | ............. | 205/599 |
| 4,927,510 A * | 5/1990 | Olper et al. | ............. | 423/95 |
| 5,106,466 A * | 4/1992 | Olper et al. | ............. | 205/510 |
| 5,211,818 A * | 5/1993 | Moure et al. | ............. | 205/599 |
| 5,514,263 A * | 5/1996 | Spijkerman et al. | ............. | 205/348 |
| 5,630,931 A * | 5/1997 | Manequini | ............. | 205/600 |
| 5,840,262 A * | 11/1998 | Margulis | ............. | 423/92 |
| 5,944,869 A * | 8/1999 | Modica et al. | ............. | 75/432 |
| 7,498,012 B2 * | 3/2009 | Olper et al. | ............. | 423/434 |
| 2007/0028720 A1 | 2/2007 | Sommariva et al. | | |
| 2010/0034715 A1 * | 2/2010 | Martini | ............. | 423/92 |

FOREIGN PATENT DOCUMENTS

| | | |
|---|---|---|
| EP | 0 508 960 | 10/1992 |
| GB | 2 183 623 | 6/1987 |
| GB | 2 185 348 | 7/1987 |
| IT | 01239001 | 9/1993 |
| WO | 2005 007904 | 1/2005 |

OTHER PUBLICATIONS

Nedwed et al, "Feasibility of Extracting Lead from Lead Battery Recycling Site Soil Using High-concentration Chloride Solutions", Environmenal Progress, 2000, vol. 19, No. 3, pp. 197-206.*

Yanakieva et al, "Desulphurization of the damped lead battery paste with potassium carbonate", Journal of Power Sources, 2000, vol. 85, pp. 178-180.*

* cited by examiner

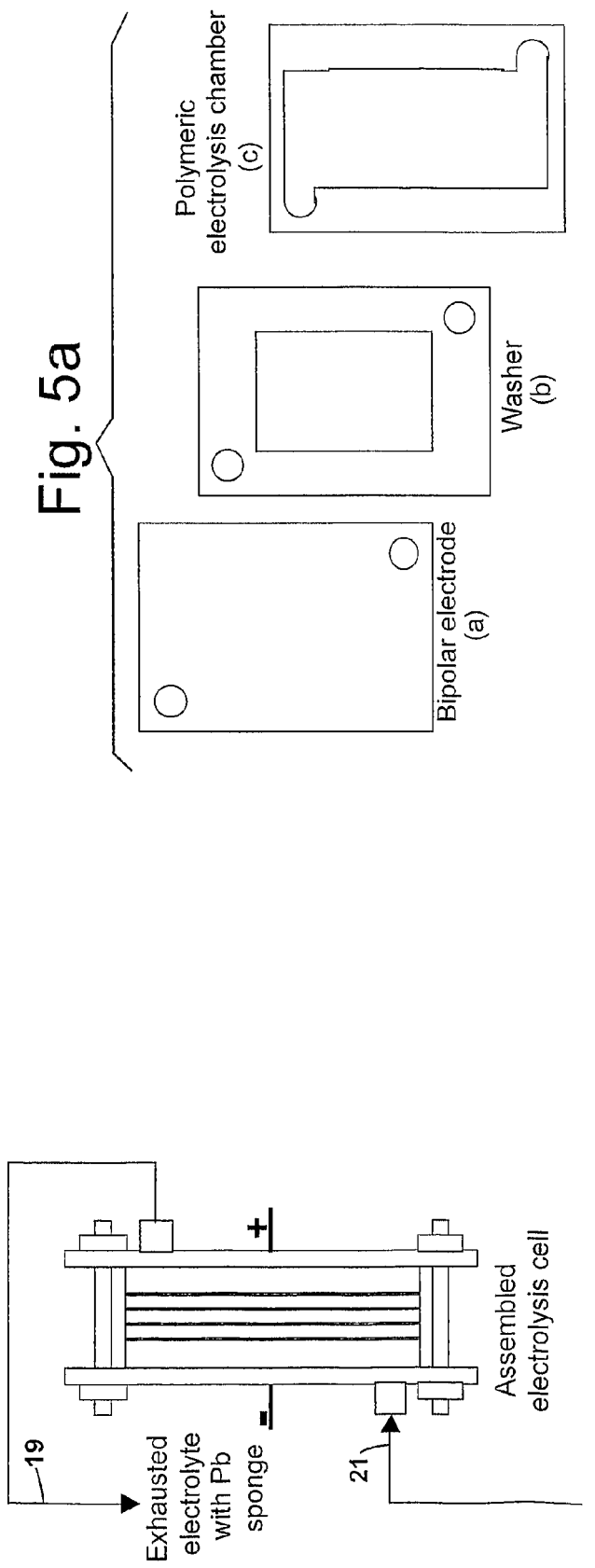
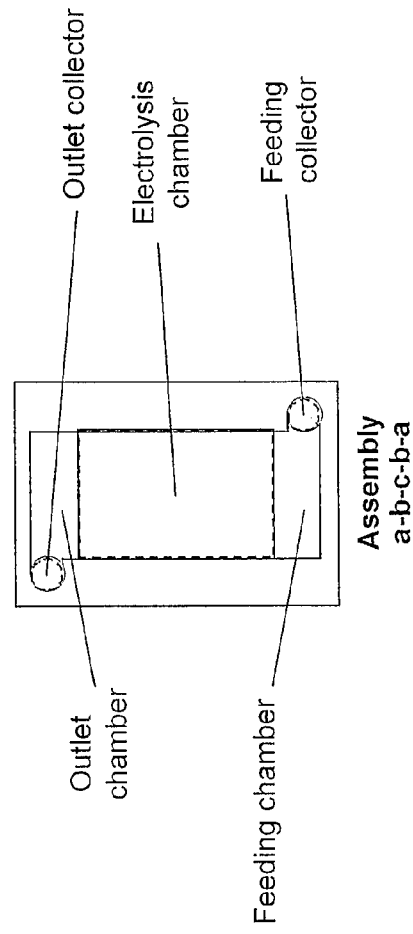
Fig. 5
Fig. 5a
Fig. 5b

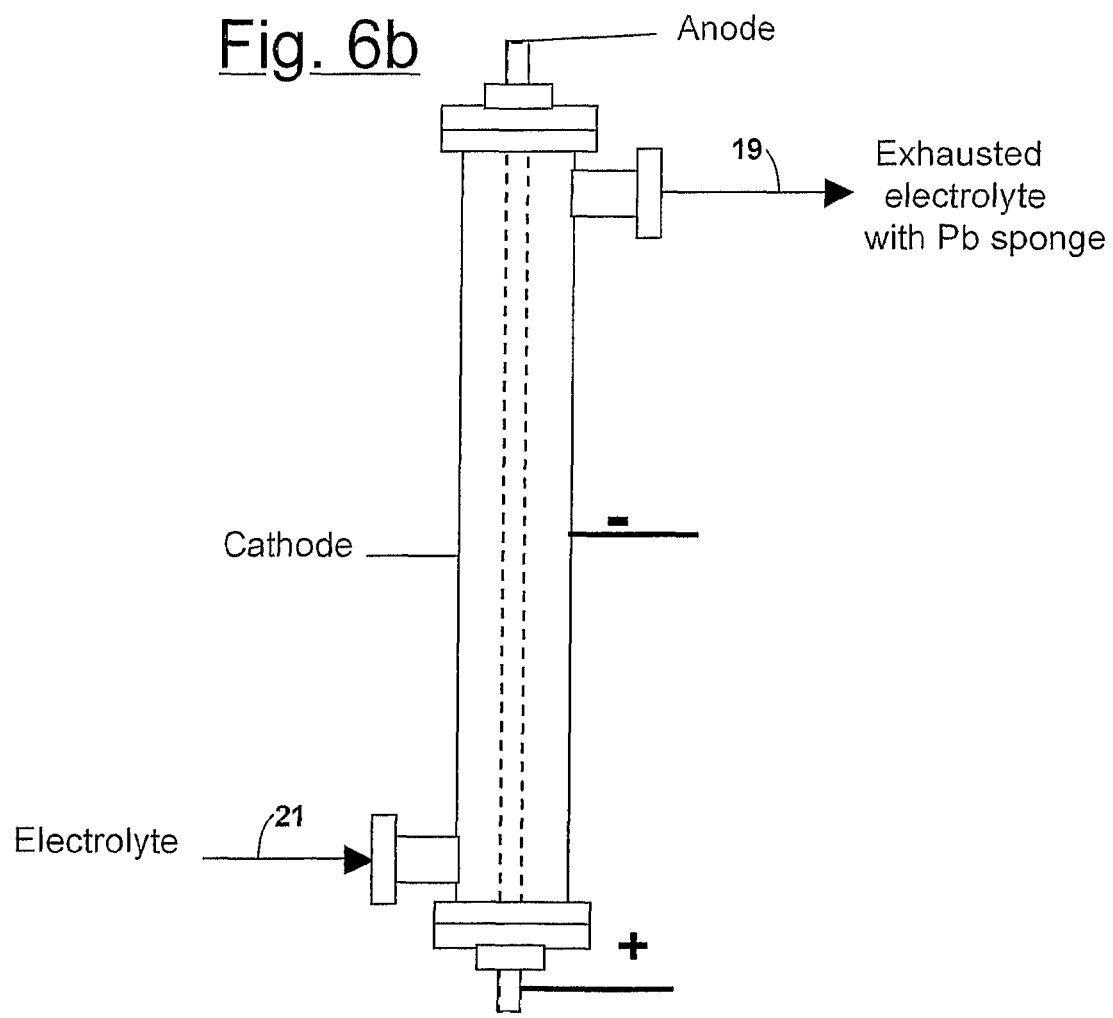

PROCESS FOR PRODUCING METALLIC LEAD STARTING FROM DESULFURIZED PASTEL

This application is a 371 of PCT/IB2008/003307 filed Nov. 27, 2008.

The present invention relates to a process for producing metallic lead starting from desulfurized pastel.

The present invention derives from the field of treatment and recycling processes of lead, in particular the lead contained in exhausted lead accumulators.

Modern recovery processes of the lead contained in exhausted accumulators are based on the melting in specific ovens of plumbiferous fractions deriving from wet grinding and separation operations of accumulators, which also contain, in addition to lead, other components such as electrolytes, separators and also parts made of ebonite and polypropylene.

The plumbiferous fraction recovered from the recycling of lead accumulators, essentially consists of a metallic fraction, which comprises the grids and poles, and a paste, called pastel, which forms the active part of the battery applied on the grids, i.e. the part where the charging and discharging reactions take place. Two types of processes for recovering the lead contained in the pastel are essentially known in the state of the art: the thermal process, which consists in melting the pastel, as such or pretreated, or the electrolytic process, which consists in the cathode deposition of metallic lead by the electrolysis of a solution in which the lead contained in the pastel has been dissolved.

The recovery of the lead through the thermal process has numerous disadvantages.

Pastel consists of a mixture of lead compounds such as $PbSO_4$ and $PbO_2$ with smaller quantities of $Pb_2O(SO_4)$, $Pb_2O_3$ and Pb, together with silicates, $BaSO_4$ and other additives. The presence of $PbSO_4$ and $Pb_2O(SO_4)$ ensures that the sulfur content of the pastel is relatively high (about 6% by weight with respect to the weight of the pastel). During the melting of the pastel, which is carried out under reducing conditions, the sulfurized species are reduced to sulfur dioxide ($SO_2$), thus generating abundant emissions of this pollutant into the atmosphere.

In order to prevent, or at least attenuate, the environmental problem linked to the emissions of $SO_2$, before being melted, the pastel can be subjected to a desulfurization treatment to remove the sulfur contained therein.

According to the most widely-used desulfurization methods, the pastel is put in contact with solutions of alkalis such as $Na_2CO_3$, $(NH_4)_2CO_3$ or NaOH in single-step batch reactors for a time of 1 hour approximately, at temperatures within the range of 50-80° C. The dispersion obtained at the end of the desulfurization process is subsequently subjected to a filtration in a filter-press. Two products therefore result from the filter-press: desulfurized pastel, with a very low concentration of sulfur and sodium, and a solution containing concentrations of sodium sulfate varying from 18% to 20% by weight. The filtered solution can be subjected to crystallization, thus obtaining sodium sulfate in crystals which can be used as raw material in various industrial processes, for example in the production fields of glass and detergents.

As an alternative to the desulfurization pre-treatment of the pastel, it is possible to limit the polluting emissions of $SO_2$ by adding additives to the pastel, before feeding it to the oven, whose function is to fix the sulfur inside the melting scum.

Although this operation leads to a large reduction in the $SO_2$ emissions, which are still considerable however, it generates a quantity of scum to be disposed of which is proportional to the quantity of additive added. The most commonly used additives are $Na_2CO_3$ and scrap-iron, which are added together with coal. The sodium carbonate and iron serve to block the sulfur inside the scum through the formation of a ternary matte, having the composition $xNa_2S.yFeS.zPbS$, whereas the coal is the reducing agent which serves to convert the lead compounds into metallic lead. The ternary matte however, in addition to sulfur, also entraps significant quantities of lead, thus lowering the overall yield of the recovery process.

A further problem linked to the formation of scum is connected with the rise in the operating temperature of the melting oven. The presence of scum, in fact, causes a higher temperature to be reached in the oven, as it melts at higher temperatures than lead, consequently increasing the energy consumption of the thermal process. The melting of the scum is necessary for preventing solids from floating on the molten lead, which are of no help in protecting the molten lead. The scum, moreover, occupies a part of the volume of the oven which could be used for the melting of further pastel. Finally, due to its lead content, scum is difficult to recover or dispose of.

In addition to the disadvantages of the thermal process described above, there is also the considerable encumbrance of the machinery necessary for the melting process as well as the relative purity obtainable for the lead produced, which, as it is alloyed with other metallic impurities, consequently requires subsequent refining treatment.

In view of the problems associated with the use of thermal processes, growing attention has been paid for some time to processes of the electrolytic type for recovering the lead contained in the pastel of exhausted accumulators, due to the relative environmental advantages (absence of polluting emissions, reduced energy consumptions, etc.). The various types of known electrolytic processes in the state of the art, however, are not suitable for being effected on a large-scale industrial level.

U.S. Pat. No. 1,752,356, for example, describes a process comprising the direct leaching of the lead contained in the pastel with caustic soda, followed by cementation with lead sponge and electrolysis. The lead sponge produced, in relation to the operating conditions selected, can be dense and adherent or soft and non-adherent. The lead present in the form of dioxide is reduced by heating in the presence of a reducing agent.

U.S. Pat. No. 4,096,045 describes a process comprising the direct leaching of the pastel with NaCl and HCl in a horizontal, stirred reactor. From this solution, crystals of lead chloride are crystallized, which are subsequently dissolved in a mixture of molten KCl and LiCl. The crystals are then subjected to electrolysis in a cell, producing metallic Pb at the cathode, which goes onto the bottom and is recovered, and chlorine at the anode, which is used for producing HCl through a combustion with hydrogen U.S. Pat. No. 4,107,007 describes a process comprising the direct leaching of the pastel with a solution of alkaline hydroxides, containing molasses or sugars, and the subsequent electrolysis of this solution. The quality of the lead obtained, however, is not sufficient for satisfying the quality standards requested by the market.

U.S. Pat. No. 4,118,219 describes a process which envisages desulfurization with ammonium carbonate and the use of reducing agents, such as formaldehyde, hydrogen peroxide and metallic lead, for reducing the lead dioxide.

U.S. Pat. No. 4,229,271 describes the desulfurization treatment of an aqueous dispersion of pastel with sulfur dioxide (or alternatively $Na_2SO_3$, $NaHSO_3$ or $NH_4HSO_3$) for reducing the lead dioxide. The solid filtered after desulfurization is dissolved in fluorosilicic acid and the leach liquor obtained is subjected to electrolysis using an anode insoluble in graphite.

U.S. Pat. No. 4,460,442 describes treatment of the pastel at 100-120° C. in a concentrated solution of alkalis to obtain a red precipitate of minimum. The precipitate is soluble in hot concentrated solutions of fluoroboric or fluorosilicic acid in the presence of metallic lead. The solution of alkalis is then subjected to electrolysis with insoluble anodes with the development of oxygen.

U.S. Pat. No. 4,927,510 describes the desulfurization of the pastel with caustic soda obtaining a desulfurized pastel to be dissolved in fluoroboric acid. The lead dioxide, which forms an insoluble residue, is then treated with concentrated sulfuric acid and converted into lead sulfate, contemporaneously eliminating the organic compounds. This lead sulfate returns to the desulfurization. The fluoroboric leach liquor is electrolyzed using insoluble anodes with the development of oxygen.

U.S. Pat. No. 5,262,020 describes a process comprising the desulfurization of the pastel of ammonium carbonate. The desulfurized pastel is then leached with a fluoroboric electrolyte, adding a titanium salt (or alternatively a salt of vanadium, cerium or iron) to obtain the reduction of the lead dioxide and its dissolution during the leaching. The presence of the above salts negatively influences the deposition, whereas the continuous transfer of alkalis to the fluoroboric system considerably jeopardizes the purification of the electrolyte.

Other electrolytic processes are also known, which comprise the leaching of the lead with solutions of chlorides which, however, have the disadvantage of producing gaseous chlorine at the anode, thus requiring a cell which is difficult to manage on an operative level due to the presence of a separator, a closed anodic compartment and the necessity of finding a destination for the chlorine produced.

In short, electrolytic processes for recovering lead from pastels have not achieved concrete realizations on an industrial scale as a result of the following problems:
  the high cost of the chemical reagents necessary for the desulfurization and for the reduction of the lead dioxide;
  the accumulation of alkaline compounds in the acid electrochemical systems which are difficult to purify;
  the production of waste and by-products which are difficult to dispose of or recycle in other production cycles;
  the relatively low extraction yields of the lead from the pastel;
  the high energy consumption in the case of process which involve the development of oxygen;
  the necessity of using special anodes, which are costly and have a limited duration.

In view of the problems arising from the state of the art for recovery processes of lead from the pastel in accumulators, a first objective of the present invention is to define a process for producing metallic lead from desulfurized pastel with high yields, low energy consumption and chemical reagents, and with a reduced environmental impact.

A second objective of the resent invention is to provide a process for producing metallic lead from desulfurized pastel which is accompanied by the production of reduced quantities of residues or high-quality by-products allowing them to be re-used in other industrial production cycles.

A further objective of the present invention is to provide a desulfurization process which is simpler and more effective than those known in the state of the art.

These and other objectives, which will appear evident to experts in the field, are achieved by the object of the present invention.

An object of the present invention relates to an electrolytic process for producing metallic lead starting from desulfurized lead pastel comprising the following operative phases:
  a) leaching the desulfurized pastel by putting it in contact with a solution comprising ammonium chloride, with the formation of a leach liquor and development of gaseous $CO_2$;
  b) separating a first solid residue and a first clarified leach liquor from the leach liquor coming from phase a);
  c) leaching the solid residue separated in phase b) by putting it in contact with a solution comprising ammonium chloride and hydrogen peroxide;
  d) separating a second solid residue and a second clarified leach liquor from the leach liquor coming from phase c);
  e) joining the first clarified leach liquor coming from phase b) with the second clarified leach liquor coming from phase d) and forming a single solution;
  f) subjecting the electrolytic solution leaving phase e) to electrolysis in a flow cell, with a current density ranging from 50 to 10,000 $A/m^2$, said electrolysis resulting in the formation of a lead sponge.

A further object of the present invention is a desulfurization process of a lead pastel containing sulfur comprising the following operative phases:
  1) reacting the pastel to be desulfurized with an aqueous solution comprising ammonium carbonate, said solution having a lower concentration than that stoichiometrically necessary for completely desulfurizing the pastel, with the formation of a partially desulfurized pastel and a solution essentially containing ammonium sulfate;
  2) reacting the partially desulfurized pastel leaving phase 1) with a second aqueous solution comprising ammonium carbonate, said solution having a higher concentration than that stoichiometrically necessary for completing the desulfurization of the partially desulfurized pastel, with the formation of a completely desulfurized pastel and a solution of ammonium carbonate at a reduced concentration;
  3) recycling the solution of ammonium carbonate in a reduced concentration leaving phase 2) to phase 1).

Figure 2:
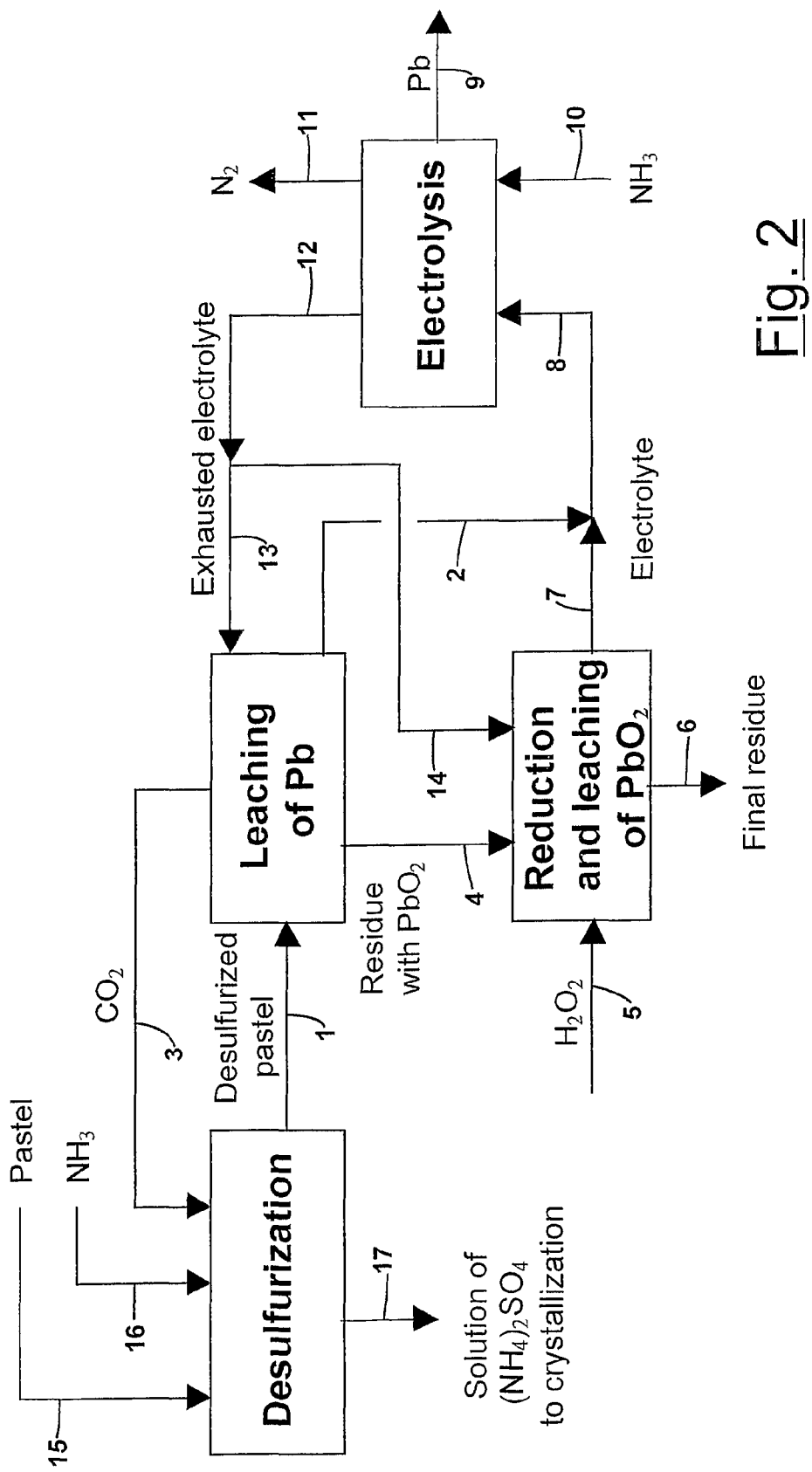
Figure 3:
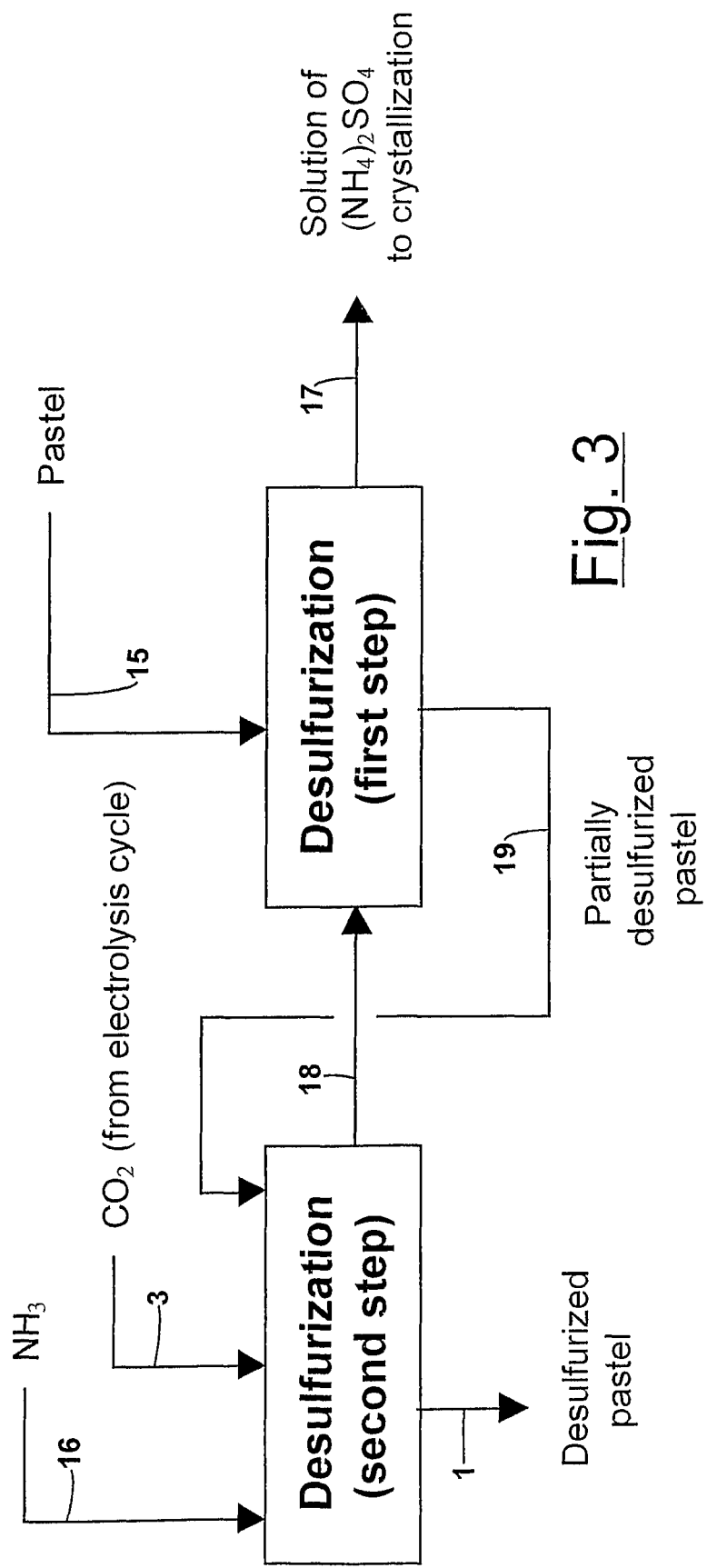
Figure 4:
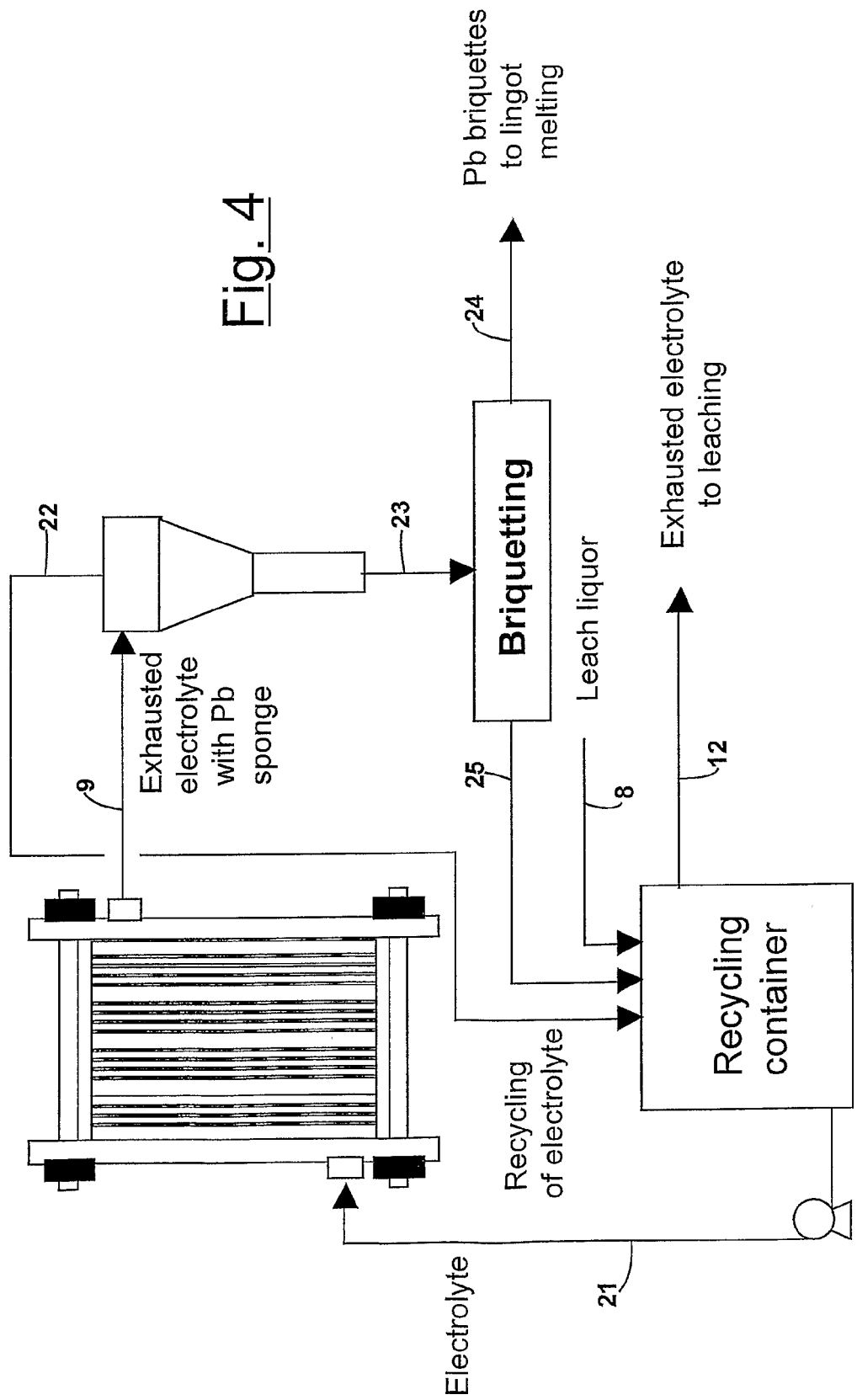

The electrolytic process for producing metallic lead according to the present invention is described hereunder with reference to the following figures:
  FIG. 1: schematic representation of a possible embodiment of the electrolytic process for the production of lead;
  FIG. 2: schematic representation of a possible embodiment of the electrolytic process for the production of lead integrated with the desulfurization process;
  FIG. 3: schematic representation of a possible embodiment of the desulfurization process in two steps;
  FIG. 4: schematic representation of a possible embodiment of the process for producing lead in the form of briquettes;
  FIG. 5: schematic representation of an electrolytic flow-cell of the filter-press type;
  FIG. 5a: schematic representation of the separate components of an electrolytic flow-cell of the filter-press type;
  FIG. 5b: schematic representation of the superimposed components of an electrolytic flow-cell of the filter-press type;
  FIG. 6a: schematic representation of an electrolytic flow-cell of the tubular type;
  FIG. 6b: schematic representation of a view from above of an electrolytic flow-cell of the tubular type.

The electrolytic process for producing metallic lead starting from desulfurized pastel according to the present invention is based on the leaching of the lead contained in the pastel by means of a solution comprising ammonium chloride. The subsequent electrolysis of the resulting leach liquor with a high current density allows the deposition of a metallic lead sponge to be obtained at the cathode, not adhering to the electrode, which is continuously recovered.

The pastel to be sent to the electrolytic production process of metallic lead can be desulfurized according to methods known to experts in the field. It is possible however to increase the overall yield of the production process of metallic lead, by integrating it with a specific desulfurization process which exploits some or all of the reaction by-products of the same electrolytic process.

In phase a) of the electrolytic production process of metallic lead according to the present invention, the desulfurized pastel (1) is leached in a solution containing ammonium chloride at a concentration varying from 100 to 600 g/l, preferably equal to about 200 g/l. This leaching phase (phase a) is carried out at a temperature ranging from 50 to 110° C., preferably at about 75° C., for a duration varying from 10 minutes to 5 hours, preferably about 30 minutes.

The leaching of the lead contained in the pastel takes place according to the following equations:

$$PbCO_3 + 3NH_4Cl \rightarrow NH_4PbCl_3 + 2NH_3 + CO_2 + H_2O \quad (I)$$

$$PbO + 3NH_4Cl \rightarrow NH_4PbCl_3 + 2NH_3 + H_2O \quad (II)$$

In this leaching phase, the lead present in the form of $PbO_2$ is not dissolved by the action of the chlorine and ammonium ions and remains in solution as a solid residue.

The leaching reaction of the pastel (I) is accompanied by the development of gaseous $CO_2$.

In the subsequent phase of the process (phase b)), the leach liquor resulting from phase a) is subjected to a solid/liquid separation in which a solution containing lead (2) is separated together with a first solid residue (4) comprising lead in the form of dioxide ($PbO_2$). The separation can be effected by means of a vacuum system, such as for example a belt or pressure filter, or a filter press.

In order to bring the lead contained in the residue comprising $PbO_2$ into solution, the residue is subjected to a leaching treatment and reduction in a solution comprising ammonium chloride in the presence of $H_2O_2$ (5) (phase c)). This phase is carried out at a temperature varying from 50 to 110° C., preferably at about 75° C., for a duration varying from 10 minutes to 5 hours, preferably for about 1 hour. The dissolution of the lead is effected through the reduction of $PbO_2$ to $PbO$ according to the reaction (III):

$$PbO_2 + H_2O_2 \rightarrow PbO + O_2 + H_2O \quad (III)$$

followed by the dissolution of PbO according to reaction (II). Alternatively, the reduction of $PbO_2$ can also be obtained using metallic lead as reducing agent (for example lead sponge) according to the reaction (IV):

$$PbO_2 + Pb \rightarrow 2PbO \quad (IV)$$

Reaction (IV) is characterized by a much slower kinetics than reaction (III), but has the advantage of being economically more convenient.

The leach liquor resulting from the dissolution of $PbO_2$ is subjected to a solid/liquid separation (phase d)) in which a second solution containing lead (7) is separated together with a second solid residue (6) (final residue) containing the insoluble species deriving from the various components used in the construction of batteries.

The leach liquor (7) is then joined to the leach liquor (2) obtained from the first leaching of the pastel to form a single solution (8) (phase e)) to be subjected to the subsequent electrolysis phase.

The electrolysis phase (phase f)) is effected in an electrolytic flow cell capable of guaranteeing linear electrolyte flow rates varying from 0.1 to 20 m/s, preferably about 2 m/s. The current density used in the electrolysis process preferably ranges from 50 to 10,000 A/m², and is more preferably about 2,000 A/m², whereas the temperature ranges from 50 to 110° C., and is preferably about 75° C. The process is of the continuous type as the lead, detaching itself from the electrode on which it is produced, is entrained outside the cell due to the electrolyte flow. It is consequently not necessary to interrupt the process to recover the final product.

Examples of flow cells which can be used for the purposes of the present invention are cells of the filter press type (FIGS. 5, 5a and 5b) or those of the tubular type (FIGS. 6a and 6b). In both types of cell, the connection of the electrodes can be of the monopolar or bipolar type; and the electrodes can be of the metallic or graphite (IV) and (V) type.

The following chemical reactions take place in the electrolytic cell:

at the cathode $$NH_4PbCl_3 + 2H^+ + 2\ e^- \rightarrow Pb + NH_4Cl + 2HCl \quad (IV)$$

at the anode $$2NH_4Cl \rightarrow Cl_2 + 2NH_3 + 2H^+ + 2\ e^- \quad (V).$$

The anodic reaction is followed by the very rapid chemical reaction:

$$Cl_2 + 8/3NH_3 \rightarrow 1/3N_2 + 2NH_4Cl \quad (VI)$$

and consequently the overall reaction of the electrolytic process is the following (VII):

$$NH_4PbCl_3 + 8/3NH_3 \rightarrow Pb + 1/3N_2 + 3NH_4Cl \quad (VII)$$

The electrolysis process (VII) leads to the deposition at the cathode of metallic lead in the form of a lead sponge, which, as it does not adhere to the electrode, is entrained by the electrolytic solution (9) which flows towards the outlet of the cell.

From the reaction (VII), it is evident that the electrolytic production process of lead according to the present invention uses up ammonia, which is consumed at the anode with the development of nitrogen (11). During the electrolysis, it is consequently necessary to add ammonia (10) inside the cell, in addition to water necessary for reintegrating that which has been evaporated. Furthermore, the addition of ammonia is also necessary for maintaining the pH of the reaction environment at a value varying from 6 to 7 in order to avoid secondary reactions which, in addition to reducing the process yield, lead to the formation of dangerous products (for example chloroamines).

As the electrolysis process proceeds, the exhausted electrolyte containing the lead sponge (9) leaves the cell and is subjected to a solid/liquid separation process (for example by means of a hydrocyclone). The process leads to the separation, on the one hand, of the lead sponge imbued with the electrolytic solution (23), and on the other, of the clarified electrolytic solution (22) (FIG. 4).

The lead produced with the process according to the present invention can also be subjected to a subsequent briquetting phase. For this purpose, the lead sponge (23) imbued with the electrolytic solution is sent to a briquetting machine where lead briquettes (24) are produced which can be subsequently transformed into lingots after melting. The imbibition liquid separated from the briquettes (25), on the other hand, can be recycled into the electrolytic cycle.

In a preferred embodiment of the production process of lead according to the present invention, the consumptions of reagents can be limited by optimizing the flows of the electrolytic solutions as shown in FIG. 4. For this purpose, the electrolytic cell is connected to an electrolytic collector (recycling container) from which the solution to be subjected to electrolysis (21) is sent to the cell by means of a pump. The solution (8) coming from the leaching of the pastel, the electrolytic solution clarified after separation of the lead sponge (22) and, possibly, the solution (25) containing the electrolytic imbibition liquid separated from the briquettes, are sent to the recycling container and mixed.

Following the continuous feeding of the electrolyte (8) coming from the leaching phase of the pastel, to the recycling container, a part of the exhausted solution contained in the recycling container is recycled as solution (12) for leaching the desulfurized pastel (13) and/or the $PbO_2$ (14). The solution (12), in fact, in addition to residual metallic lead, contains ammonium chloride and alkaline and alkaline-earth metal chlorides (for example NaCl, KCl, CaCl, MgCl) deriving from the leaching of other components of the pastel. The presence of these metals, however, does not influence the process.

The whole process can therefore be carried out in continuous.

As mentioned above, the desulfurization of the pastel can be effected using any of the techniques known to experts in the field. The pastel can also be desulfurized by contact with a solution containing ammonia alone. Desulfurization with ammonia alone, however, is not particularly effective for questions of thermodynamic equilibrium, resulting in a maximum removal of about 70% of the sulfur present in the pastel, regardless of the excess reagent used. Much higher desulfurization levels (almost 100%) can be obtained, on the other hand, by putting the pastel to be desulfurized in contact with a solution of ammonium carbonate. This type of desulfurization has the advantage that, once the desulfurized pastel has been separated, it is possible to recover a solution comprising ammonium sulfate from which solid ammonium sulfate can be separated by crystallization, which can be used as raw material in numerous other industrial cycles. In the production process of lead according to the present invention, the desulfurization with ammonium carbonate can be used in a particularly advantageous manner, as it is suitable for being integrated in the cycle with a considerable saving of chemical reagents. When the desulfurization with ammonium carbonate is integrated with the electrolytic production process of lead according to the present invention, it can be effected by introducing the pastel to be desulfurized into a solution containing ammonia (16) and subsequently putting the solution under a pressure of gaseous $CO_2$ varying from 10 to 1,000 mm $H_2O$, at a temperature ranging from 50 to 110° C., to form the ammonium carbonate necessary for the desulfurization. The gaseous $CO_2$ used is preferably that produced by the dissolution reaction (I) in the leaching phase of the pastel (FIG. 2). In this way, it is possible to obtain a practically complete desulfurization of the pastel, by exploiting the products of the electrolysis reaction, with a consequent decrease in the consumption of the chemical reagents used in the process. Furthermore, once the desulfurized pastel has been separated, a commercially high-quality by-product, such as ammonium sulfate, is obtained from the desulfurization.

In a preferred embodiment of the present invention, the desulfurization process integrated with the electrolytic process for the production of lead can be made even more efficient by effecting it in two successive steps (FIG. 3). In the first step, the pastel to be desulfurized (15) is reacted with an aqueous solution comprising ammonium carbonate in a concentration lower than the value which is stoichiometrically necessary for completely desulfurizing the pastel. Consequently, the desulfurization only proceeds partially and the partially desulfurized pastel (19) passes on to the second step, where it is reacted with an aqueous solution of ammonium carbonate having a concentration higher than that which is stoichiometrically necessary for completing the desulfurization of the partially desulfurized pastel. At the end of the desulfurization in the second step, the pastel is separated from the solution containing the non-reacted residual ammonium carbonate. The desulfurized pastel is sent to phase a) of the electrolytic process, whereas the solution containing the residual ammonium carbonate (18) is recycled to the first desulfurization step. From the first step, moreover, it is possible to recover a solution (17) from which ammonium sulfate can be crystallized, i.e. a commercially high-quality by-product.

Also in the case of the two-step desulfurization process, the solution of ammonium carbonate can be obtained by sending the $CO_2$ (3) produced in the leaching phase of the pastel into a solution containing ammonia, as schematically shown in FIG. 3.

The electrolytic process for the production of lead according to the present invention is preferably effected in cells of the filter press type or tubular type. Other types of cells, however, can also be used, even if the investment costs, operating costs and final yield of the lead production are substantially different.

FIGS. 5, 5a and 5b illustrate an embodiment of a filter press cell. The cell consists of a compact assemblage of electrodes (a), washers (b) and a polymeric drawpiece (c), which are superimposed according to the sequence (a)-(b)-(c)-(b)-(a). The form of the polymeric drawpiece is such as to obtain an electrolysis chamber having a fine thickness 5-30 mm, preferably 10 mm. In this way, even with relatively low electrolyte flows, high linear rates are obtained which are sufficient for carrying the lead sponge outside as this is produced. The connection between the electrodes can be either monopolar or bipolar. The latter, obtained by connecting the positive pole on the first electrode of the unit and the negative pole on the latter, is the preferred connection as it has the advantage of simplifying the connections to the rectifier.

FIG. 6 shows an example of a tubular cell consisting of two concentric tubes of which the outer tube acts as cathode and the inner tube as anode, even if the opposite configuration of the electrodes, i.e. inner cathode and outer anode, can be equally used. The inner tube which forms the anode, which could also be a full bar, must have a metallic matrix and requires a catalyst on which chlorine can develop. The electric connection can be either monopolar or bipolar.

Regardless of the type of cell used, the preferred operative conditions for the electrolysis are those which favour the detachment of the lead produced by the cathode and, i.e., high temperatures, high current density, low concentration of lead in the electrolyte and high linear rate of the electrolyte in the cell, so as to mechanically remove the lead produced at the cathode, by entrainment. The current density however must be lower than the limit value for the deposition of lead in order to avoid pointlessly losing production capacity, at the same time increasing the energy consumptions of the electrolytic process.

The production process of lead according to the present invention offers numerous advantages. It allows metallic lead to be recovered from the pastel of lead accumulators with high yields, low energy consumptions and reagents and a reduced environmental impact.

With respect to the electrolytic production processes known in the state of the art, the process according to the present invention has relatively high yields, considerably reducing the use of operators and avoiding contact with the process fluids on the part of the operators. This means producing lead in a much healthier working environment than those currently available. By using desulfurization with ammonium carbonate, it is possible to exploit the exhausted electrolyte solutions with a consequent saving of raw materials, the only reagent consumed being ammonia, and the recovery of high-quality commercial by-products (ammonium sulfate). Furthermore, unlike the electrolytic processes known in the state of the art, the production process of lead according to the present invention does not require cells having a complex structure with separators or diaphragms and it does not lead to the development of gaseous chlorine, thus simplifying the management of the process.

Finally, polluting fumes are not emitted from the process according to the present invention, nor is there scum containing lead to be disposed of as in the case of thermal processes. A further advantage with respect to the recovery via thermal processes is represented by the smaller encumbrance of the machinery necessary for effecting the electrolytic process.

The following examples are provided for purely illustrative purposes of the present invention and should not be considered as limiting the protection scope as specified in the enclosed claims.

EXAMPLE 1

1,000 g of pastel to be desulfurized, with a lead content (as Pb) equal to about 70% by weight and sulfur (as S) equal to 6.6%, were dispersed in water. 40 cc of $NH_3$ were subsequently added and additional water until a volume of 1.5 l was reached. The dispersion thus obtained was introduced into a closed container and subjected to a $CO_2$ pressure of about 15 mm $H_2O$. The solution was maintained at a temperature of 50° C. for about 30 minutes, after which the feeding of $CO_2$ was closed and the resulting solution was filtered, separating the solid reside (desulfurized pastel) contained therein. The residue was then washed abundantly with water.

The desulfurized pastel recovered weighed 1,290 g (wet) whereas after drying it weighed 928 g dry (humidity 39.0% by weight with respect to the weight of the dry solid). Chemical analysis indicated a presence of non-extracted sulfur lower than 0.1% by weight (present as $PbSO_4$) and, consequently, a desulfurization yield higher than 99% by weight. After separation and washing of the solid residue, the solution consisted of 2 l of odourless liquid (including the washing water), having a pH of 6.7 approximately and containing 125 g/l of $(NH_4)_2SO_4$.

The desulfurized pastel was then leached for 30 minutes at 75° C., in a stirred reactor, with 60 l of solution (S1) having the following composition:

| | |
|---|---|
| $NH_4Cl$ | 198 g/l |
| NaCl | 85 g/l |
| KCl | 15 g/l |
| CaCl | 10 g/l |
| MgCl | 2 g/l |
| Pb | 11 g/l |

The leach liquor was filtered, separating an insoluble solid residue, comprising $PbO_2$, which was washed intensely.

The 61 l of resulting leach liquor (S2), comprising the washing water of the insoluble solid residue, had the following composition:

| | |
|---|---|
| $NH_4Cl$ | 180 g/l |
| NaCl | 70 g/l |
| KCl | 12 g/l |
| CaCl | 8 g/l |
| MgCl | 1.5 g/l |
| Pb | 19.0 g/l. |

After washing, the wet residue weighed 412 g approximately, whereas after drying it weighed 322 g (humidity 28% by weight with respect to the weight of the dry residue).

The residue was then dispersed in 25 l of solution (S1). 136 g of $H_2O_2$ at 30% v/v were then added to the solution, leaving the mixture under stirring for 1 h. The solution was filtered and the additional residue (final residue) was washed. After separation of the final residue, 25.5 l of leach liquor (S3) were recovered, comprising the washing water of the residue. The leach liquor had the following composition:

| | |
|---|---|
| $NH_4Cl$ | 183 g/l |
| NaCl | 72 g/l |
| KCl | 12 g/l |
| CaCl | 9 g/l |
| MgCl | 1.8 g/l |
| Pb | 20.3 g/l |

After intense washing, the final residue weighed 55 g approximately (wet) whereas after drying it weighed 42 g (humidity 31.0% by weight with respect to the weight of the dry residue). The lead content of this residue was equal to 4.0% by weight, corresponding to an extraction yield of the lead higher than 99% by weight.

The second leach liquor (S3) was then added to the first leach liquor (S2), thus obtaining 86.5 l of solution to be subjected to electrolysis (S4) having the following composition:

| | |
|---|---|
| $NH_4Cl$ | 181 g/l |
| NaCl | 71 g/l |
| KCl | 12 g/l |
| CaCl | 9 g/l |
| MgCl | 1.6 g/l |
| Pb | 19.4 g/l |

The solution (S4) was subjected to electrolysis in a flow cell with graphite electrode of 5×10 cm (50 cm$^2$), at a distance of 1 cm from each other and fed with a current of 10 A (current density=2,000 A/m$^2$).

The flow-rate of the feeding pump of the electrolytic solution at the cell was 3 m$^3$/h corresponding to a linear flow rate of the electrolyte in the cell of 1.67 m/s. The electrolysis was carried out at 75° C. for 12 h. The water evaporated during the cycle was reintegrated. During the test, 185 ml of ammonia were added to reintegrate the ammonia consumed in the electrolysis, corresponding to 140 g/l. The average cell voltage applied was 2.54 V.

At the end of the electrolysis process, 399.4 g of sponge were obtained (weight after the washing and drying) and 86.5 l of solution containing 14.8 g/l of residual lead dissolved in solution.

The deposition yield, calculated as percentage weight of the sponge washed and dried with respect to the total weight of the lead depositable in relation to the current which passed through the electrolytic solution, was 86.2%, whereas the energy consumption was 762 kWh/t of lead.

EXAMPLE 2

The solution (S4) of Example 1 was fed to a tubular cell having the following characteristics: titanium cathode tube having an internal diameter of 25 mm; an internal anode tube made of activated titanium with a copper core having an internal diameter of 8 mm; average distance between the anode and cathode equal to 8.5 mm; length of the cell 64 mm. These structural parameters of the cell correspond to a cathode surface of 50 cm$^2$ and an anode surface of 16 cm$^2$. The current fed was 10 A corresponding to the following current densities: anode 6,250 A/m$^2$, cathode 2,000 A/m$^2$.

The flow-rate of the feeding pump of the electrolytic solution to the cell was 3 m$^3$/h corresponding to a linear flow-rate of the electrolyte in the cell of 1.89 m/s. The electrolysis was carried out at 75° C. for 12 h. The water evaporated during the cycle was reintegrated. During the test, 187 ml of ammonia were added, corresponding to a concentration of 140 g/l. The average cell voltage applied was 2.76 V.

At the end of the electrolysis process, 404.2 g of sponge were obtained (weight after washing and drying) and 86.5 l of solution containing 10.1 g/l of residual lead dissolved in solution.

The deposition yield, calculated as percentage weight of the washed and dried sponge with respect to the total weight of the lead depositable in relation to the current that passed through the electrolytic solution, was 87.1%, whereas the energy consumption was 819 kWh/t of lead.

The invention claimed is:

1. An electrolytic process for producing metallic lead starting from desulfurized lead pastel comprising:
    a) leaching the desulfurized pastel by putting it in contact with a solution comprising ammonium chloride, with the formation of a first leach liquor and development of gaseous $CO_2$;
    b) separating a first solid residue and a first clarified leach liquor from the first leach liquor;
    c) leaching the first solid residue by putting it in contact with a solution comprising ammonium chloride and hydrogen peroxide to obtain a second leach liquor;
    d) separating a second solid residue and a second clarified leach liquor from the second leach liquor;
    e) joining the first clarified leach liquor with the second clarified leach liquor and forming a single solution;
    f) subjecting the single solution to electrolysis in a flow cell, with a current density ranging from 50 to 10,000 A/m$^2$, said electrolysis resulting in the formation of a lead sponge.

2. The process according to claim 1, wherein the solutions in said leaching the desulfurized pastel of a) and/or in said leaching the first solid residue of c) comprise ammonium chloride in a concentration varying from 100 to 600 g/l.

3. The process according to claim 2, wherein said desulfurized lead pastel is obtained through a desulfurization process comprising:
    1) reacting the pastel to be desulfurized with an aqueous solution comprising ammonium carbonate, said solution having a lower concentration than stoichiometrically necessary for completely desulfurizing the pastel, with the formation of a partially desulfurized pastel and a solution essentially comprising ammonium sulfate;
    2) reacting the partially desulfurized pastel leaving phase 1) with a second aqueous solution comprising ammonium carbonate, said solution having a higher concentration than that stoichiometrically necessary for completing the desulfurization of the partially desulfurized pastel, with the formation of a completely desulfurized pastel and a solution of ammonium carbonate at a reduced concentration;
    3) recycling the solution of ammonium carbonate in a reduced concentration leaving phase 2) to phase 1).

4. The process according to claim 3, wherein the ammonium carbonate in aqueous solution used in phase 1) is obtained by a process comprising putting a solution comprising ammonia under a pressure of gaseous $CO_2$ ranging from 10 to 1,000 mm $H_2O$, at a temperature ranging from 50 to 110° C.

5. The process according to claim 1, wherein said leaching the desulfurized pastel of a) and said leaching the first solid residue of c) are effected at a temperature varying from 50 to 110° C.

6. The process according to claim 1, wherein said leaching the desulfurized pastel of a) and said leaching the first solid residue of c) are effected for a duration ranging from 10 minutes to 5 hours.

7. The process according to claim 1, wherein the current density in said subjecting the single solution of f) is about 2,000 A/m$^2$.

8. The process according to claim 1, wherein the linear rate in said subjecting the single solution of f) is about 2 m/s.

9. The process according to claim 1, wherein the electrolysis of said subjecting the single solution of f) is carried out in continuous in a flow cell.

10. The process according to claim 1, wherein during said subjecting the single solution of f) the solution is maintained at a pH varying from 6 to 7 by the addition of ammonia.

11. The process according to claim 1, further comprising:
    g) separating the lead sponge and a clarified electrolytic solution from the solution leaving f);
    h) subjecting the lead sponge to briquetting, possibly after washing it, with the formation of lead briquettes and separation of a residue of electrolytic solution impregnating the lead sponge.

12. The process according to claim 1, further comprising:
    i) recycling the clarified electrolytic solution coming from said separating of g) to said leaching the desulfurized pastel of a) and/or said subjecting of f).

13. The process according to claim 1, further comprising the following operative phase:
    1) recycling the residue of the solution impregnating the lead sponge coming from subjecting the lead sponge to briquetting of h) to said subjecting of f).

14. The process according to claim 1, wherein the clarified electrolytic solution coming from said separating of g) and/or the residue of the solution impregnating the lead sponge coming from said subjecting of h) are mixed with each other and/or with the leach liquor leaving said leaching of e) and subsequently recycled to said subjecting of f).

15. The process according to claim 1, wherein the desulfurized pastel is obtained by a process comprising desulfurizing with an aqueous solution comprising ammonium carbonate.

16. The process according to claim 15, wherein the ammonium carbonate in aqueous solution is obtained by a process comprising putting a solution comprising ammonia under a pressure of gaseous $CO_2$ ranging from 10 to 1,000 mm $H_2O$, at a temperature ranging from 50 to 110° C.

17. The process according to claims 16, wherein the $CO_2$ is developed in said leaching of a).

18. The process according to claim 1, wherein the desulfurized pastel is obtained by a process comprising:

1) reacting the pastel to be desulfurized with an aqueous solution comprising ammonium carbonate, said solution having a lower concentration than that stoichiometrically necessary for completely desulfurizing the pastel, with the formation of a partially desulfurized pastel and a solution essentially comprising ammonium sulfate;
2) reacting the partially desulfurized pastel leaving phase 1) with a second aqueous solution comprising ammonium carbonate, said solution having a higher concentration than that stoichiometrically necessary for completing the desulfurization of the partially desulfurized pastel, with the formation of a completely desulfurized pastel and a solution of ammonium carbonate at a reduced concentration;
3) recycling the solution of ammonium carbonate in a reduced concentration leaving phase 2) to phase 1).

19. The process according to claim 18, wherein the ammonium carbonate in aqueous solution used in phase 1) is obtained by putting a solution comprising ammonia under a pressure of gaseous $CO_2$ ranging from 10 to 1,000 mm $H_2O$, at a temperature ranging from 50 to 110° C.

20. The process according to claim 19, wherein the $CO_2$ is that developed in said leaching of a).

21. The process according to claim 1, wherein the flow cell used in said subjecting of f) is a filter press cell.

22. The process according to claim 1, wherein the flow cell used in said subjecting of f) is a tubular cell.

23. The process according to claim 22, wherein the tubular cell has an internal anode and an external cathode.

24. The process according to claim 1, wherein the electrodes of the flow cell used in said subjecting of f) are made of graphite or metal.

25. The process according to claim 1, wherein the connection of the electrodes of the flow cell is monopolar.

26. The process according to claim 1, wherein the connection of the electrodes of the flow cell is bipolar.

* * * * *

UNITED STATES PATENT AND TRADEMARK OFFICE
CERTIFICATE OF CORRECTION

PATENT NO. : 8,409,421 B2  
APPLICATION NO. : 12/745067  
DATED : April 2, 2013  
INVENTOR(S) : Marco Olper et al.

Page 1 of 1

It is certified that error appears in the above-identified patent and that said Letters Patent is hereby corrected as shown below:

On the title page, Item (86), The PCT information should read:

-- (86)  PCT No.:     PCT/IB2008/003307

§ 371 (c)(1),  
(2), (4) Date:    July 28, 2010 --

Signed and Sealed this  
Eleventh Day of June, 2013

Teresa Stanek Rea  
*Acting Director of the United States Patent and Trademark Office*